A. A. BLOMFELDT.
AIR CONDITIONING DEVICE.
APPLICATION FILED MAR. 6, 1911.
1,013,368.
Patented Jan. 2, 1912.
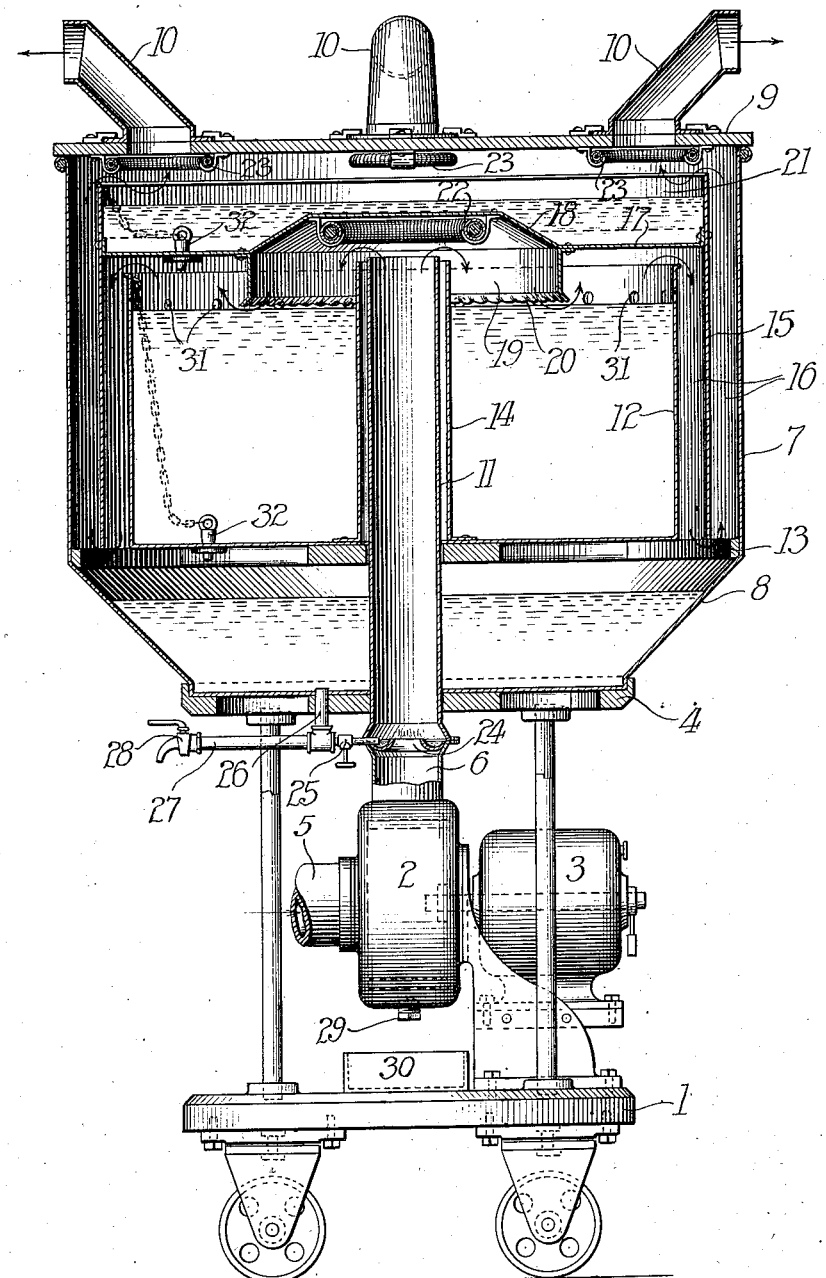

UNITED STATES PATENT OFFICE.

ALLEN A. BLOMFELDT, OF CHICAGO, ILLINOIS.

AIR-CONDITIONING DEVICE.

1,013,368. Specification of Letters Patent. Patented Jan. 2, 1912.

Application filed March 6, 1911. Serial No. 612,695.

*To all whom it may concern:*

Be it known that I, ALLEN A. BLOMFELDT, a citizen of the United States of America, and a resident of Chicago, county of Cook, State of Illinois, have invented certain new and useful Improvements in Air-Conditioning Devices, of which the following is a specification.

The main objects of this invention are to provide an improved form of air conditioning apparatus for ventilating purposes; to provide an improved apparatus of this kind capable of accomplishing the functions of heating or cooling, humidifying or dehumidifying, washing, and disinfecting air; to provide a comparatively inexpensive, simple and compact construction for such apparatus; and to provide an improved arrangement of the parts so as to give ready access to all parts of the interior and so as to make the device easily portable as a unit.

A specific embodiment of this invention is shown in sectional elevation in the accompanying drawing.

In the construction shown, the device is portably mounted on a wheeled carriage 1, and comprises a blower 2 and a motor 3, directly connected, and the air conditioning apparatus mounted on the frame 4 above the motor and blower. The blower has an air inlet 5 and outlet 6, the latter being connected with the air inlet pipe of the conditioning apparatus.

The conditioning apparatus comprises an outer casing 7, the lower part of which forms a tank or receptacle 8. At the top there is a removable closure 9 provided with a plurality of air outlet pipes 10. The air inlet pipe 11 connects with the blower outlet 6, and extends concentrically upward through the middle of the tank 8, terminating a short distance below the closure 9.

A second tank or receptacle 12 is concentrically supported within the casing 7 on a grating or spider 13 seated at the top of the conical walls of the tank 8. The tank 12 has a central tubular part 14 which fits around the inlet pipe 11 and serves to center the tank in the casing.

A hood 15 is supported in the casing with its vertical wall resting on the grating 13 concentrically of the casing 7 and tank 12, whereby there is formed a tortuous air passage 16 between the walls of the parts. A transverse partition 17 in the hood is spaced away from the top of the tank 12 and is shaped to form a dome 18, over the top of the inlet pipe 11. A baffle wall 19, secured to the partition 17 at the edges of the dome 18, extends downward into the tank 12 and terminates in a fluted skirt 20. The vertical wall of the hood 15 extends above the transverse partition 17 so as to form a liquid receptacle or tank 21 above the receptacle 12.

The air may be heated as it passes through the apparatus preferably by means of electrical coils or heaters supported within the apparatus. One of these heaters 22 is shown supported in the dome 18 above and adjacent to the end of the air inlet pipe 11. Other heaters 23 may be similarly located on the under side of the closure 9 adjacent to the air outlets 10.

For humidifying the air, an annular trough or liquid spraying device 24 is supported in the air inlet, which in the construction shown is supported at the juncture of the pipes 6 and 11. These pipes are preferably enlarged adjacent to their flanged connection so as to provide the necessary space to receive said trough 24 and also provide a sufficient space for the passage of air. This trough 24 is supplied with water through the valved pipe 25, connected to a pipe 26 secured in the bottom of the conical tank 8. The valve is set so as to permit a small stream of water to trickle into the trough 24, so as to keep it so full that it overflows and the strong air current in passing the trough breaks the overflowing water into a spray and carries it along.

A drain pipe 27 is connected to the pipe 26 and has at its end a valve 28 which is normally closed for retaining the liquid contents in the tank 8. This valve may be opened to drain off the liquid at times when it is desired to change the liquid or to cleanse the apparatus. The blower 2 is provided with a plug 29, which may be removed for the purpose of draining the blower casing, should any liquid accumulate in the bottom thereof. A pan 30 is placed on the platform under the blower to receive the liquid that is drained from the blower.

Quantities of liquid may be placed in the conical tank 8, the tank 12, and the receptacle 21 formed in the top of the hood 15. The tank 12 is provided with a plurality of apertures 31, so arranged that the level of the liquid will always be at or near (preferably slightly below) the lower edge of the fluted skirt 20. The level of the liquids in the other tanks is determined by the amount placed therein, according to the service in which the apparatus is being employed. The nature of the liquids contained in these receptacles will of course be determined by the nature of the treatment desired for the air. The liquid usually employed is water.

Each of the tanks 12 and 21 has a removable plug in its bottom so that it may be readily drained into the tank below.

The operation of the device is as follows:—Air enters the pipe 11 from the blower 2, and is deflected by the dome 18 and the depending baffle wall 19 downwardly into the tank 12, where it impinges upon the surface of the liquid and is deflected upwardly. The skirt 20 being fluted, causes the air to be evenly distributed over the surface of the liquid and directed against it substantially in the form of jets. The current of air is then deflected by the transverse partition 17 downwardly through the passage 16 between the tank 12 and the hood 15, and is caused to impinge upon the surface of the liquid in the tank 8, by which it is deflected upwardly through the passage 16 between the casing 7 and hood 15. The outlet ports 10 being positioned inwardly relative to the vertical wall of the hood 15, the air current is again deflected by the closure 9 downwardly against the surface of the liquid contained in the receptacle 21 before it passes out through the ports 10 into the room or into such pipes as may be provided for conveying the air to a desired locality. These are preferably mounted to turn in a horizontal plane.

In the summer time, it is usually desired that the normally warm air be cooled and dehumidified. In that case, the tank 12 would be filled with water and be kept cool by means of ice placed therein. The tank 8 and receptacle 21 may also be similarly filled with liquid. Thus, the air upon being forced into the conditioning apparatus through the pipe 11 is deflected downwardly against the surface of the cold water, where it gives up some of its moisture as it is cooled. If there is liquid in the tank 8, it will be further cooled and moisture will be removed therefrom by condensation as it is deflected upwardly from the surface of the liquid, and even though this air may be saturated with moisture at this lower temperature, it is cooler than the air in the room, and upon being forced out into the warmer air of the room, its temperature is increased and its relative humidity is accordingly reduced so that it actually has less humidity and is cooler than when it first entered the apparatus.

In the winter time, the apparatus may be used for heating and humidifying the air. In such case, the water in the tanks 12 and 8 does not require cooling, but is gradually warmed by the warm air of the room and by radiation from the heater 22. The trough 24 is kept slightly overflowing with water, and as the air is forced upwardly through the pipe 11, picks up the overflowing water and may carry in suspension a greater quantity of water than it could hold if it were at rest. The fine spray of water which is carried in suspension by the air is dashed against the hot surfaces of the dome and heater 22 and is instantly vaporized. The air at the same time becomes warmed so that it will absorb and retain most of the moisture taken up from the spray and may also take an additional quantity from the liquid in the tanks 12 and 8. The air current may, if desired, be further heated by the heaters 23, as it is discharged through the openings 10.

In cases where the air is particularly foul, it is desirable to place in it a suitable disinfectant in solution preferably in the receptacle 21, where the air will be treated just before it passes into the room after having been washed through its contact with the liquid in the tanks 12 and 8.

It will be noted from the drawings that the air passing from the pipe 11 into the comparatively larger space within the baffle wall 19 expands and reduces its velocity, allowing the particles of matter which are carried in suspension to fall out of the conveying air current into the water below. Whatever solid matter is carried in suspension by the entering air is saturated by the moisture from the spraying device 24. This increases the weight of those particles and accordingly assists in eliminating them from the air during the baffling operations which follow. Other particles of solid matter are removed as the air passes over the surface of the water in the tank 12 and again as it passes around the bottom of the baffle wall 15 from the comparatively narrow passage within that baffle wall into a passage of greater area outside. The water also serves the function of taking up and removing from the air any soluble gases such as carbon di-oxid and sulfuric gases.

The spraying device 24 receives its liquid by gravity from the tank 8 and the liquid is taken up in the form of a spray by the air current passing through the inlet pipe 11. Any surplus of liquid carried by the air current, and which is not absorbed, would be deposited in the tank 12. This will cause the liquid in the receptacle 12 to overflow through the apertures 31, and trickle down the sides of the receptacle. Thus, the liquid in the apparatus is kept in constant circulation when the spraying device is in use. When ice is placed in the receptacle 12, the melting thereof will also cause the liquid in the receptacle to overflow. As the liquid flows down the outside of the receptacle, the current of air is further exposed thereto and may take up more moisture or be further cooled as the case may be.

Although but one specific embodiment of this invention is herein shown and described, it will be understood that numerous details of the construction shown may be altered or omitted without departing from the spirit of this invention, as defined by the following claims.

I claim:—

1. In an air conditioning apparatus, the combination of liquid receptacles mounted one within the other in spaced relation, a baffle wall interposed between the adjacent walls of said receptacles and adapted to form a tortuous air passage between them, air deflecting means above the open part of one of said receptacles and with said baffle wall forming a closure for the space above said receptacle, each of said receptacles being adapted to hold liquid at such level that the surface thereof will deflect the air current, an air pipe terminating above and adjacent to the surface of the liquid in the inner said receptacle, a second air pipe communicating with the other said receptacle above the surface of the liquid therein, and means for causing a current of air to flow through said passage from one to the other of said pipes.

2. In an air conditioning apparatus, the combination of an outer casing, a receptacle supported therein, a hood covering said receptacle and having the walls thereof spaced away from the walls of said casing and said receptacle so as to form a tortuous air passage between them, an air pipe extending into said casing and terminating within said receptacle below said hood, a second air pipe connected to said casing, means for causing a current of air to flow through said passage from one to the other of said pipes, and said receptacle being adapted to hold liquid at such level that the surface will be in position for deflecting the air current upwardly.

3. In an air conditioning apparatus, the combination of an outer casing, a receptacle supported therein, a hood covering said receptacle and having the walls thereof spaced away from the walls of said casing and said receptacle so as to form a tortuous air passage between them, an air pipe extending upwardly through said casing and receptacle and terminating below said hood, a second air pipe connected to said casing, means for causing a current of air to flow through said passage from one to the other of said pipes, and said casing and receptacle being adapted to hold liquid at such level that the surface will be in position for deflecting the air current upwardly.

4. In an air conditioning apparatus, the combination of an outer casing, a receptacle for liquid supported within said casing, a hood covering said receptacle and having the walls thereof spaced away from the walls of said receptacle and casing so as to form a tortuous air passage between them, a second receptacle for liquid above said hood, an air inlet pipe extending into said casing and terminating below the horizontal wall of said hood, an air outlet pipe communicating with said casing above said hood inwardly of the sides of said second receptacle, and means for causing a current of air to flow through said passage from one to the other of said receptacles.

5. In an air conditioning apparatus, the combination of an outer casing, a receptacle for liquid supported within said casing, a hood covering said receptacle and having the walls thereof spaced away from the walls of said receptacle and casing so as to form a tortuous air passage between them, said hood having its vertical wall extending above the horizontal wall spanning said receptacle so as to form another receptacle for liquid, an air inlet pipe extending into said casing and terminating below the horizontal wall of said hood, an air outlet pipe communicating with said casing above said hood inwardly of the vertical walls thereof, and means for causing a current of air to flow through said passage from one to the other of said pipes.

6. In an air conditioning apparatus, the combination of a casing having an outlet opening, an inlet pipe extending upwardly into said casing and terminating below the top thereof, a hood supported within said casing and covering said inlet pipe, a receptacle supported within said hood and spaced away therefrom so as to form a tortuous air passage between the walls of said casing, hood and receptacle, liquid supported within said receptacle and casing in position to deflect the air current upwardly, and means for causing a current of air to flow through said passage from said inlet pipe to said outlet opening.

7. In an air conditioning apparatus, the combination of a casing having an air outlet, an air inlet pipe extending upwardly into said casing, a hood supported in said casing and over said inlet pipe, a receptacle supported within said hood and spaced away therefrom so as to form a tortuous air passage between the walls of said casing, hood and receptacle, a baffle wall depending from the top of said hood, said receptacle being adapted to hold liquid in such position that the surface thereof will be below the lower edge of said baffle wall and adapted to deflect air upwardly, and means for causing a current of air to flow through said passage from said inlet pipe to said outlet opening.

8. In an air conditioning apparatus, the combination of a casing having an air outlet, an air inlet pipe extending upwardly into said casing, a hood supported in said casing over said inlet pipe, a receptacle supported within said hood and spaced away therefrom so as to form a tortuous air passage between the walls of said casing, hood and receptacle, a baffle wall depending from the top of said hood and terminating in a fluted skirt, said receptacle being adapted to hold liquid in such position that the surface thereof will be below the lower edge of said baffle wall and adapted to deflect air upwardly, and means for causing a current of air to flow through said passage from said inlet pipe to said outlet opening.

9. In an air conditioning apparatus, the combination of an outer casing, a receptacle supported therein, a hood covering said receptacle and having the walls thereof spaced away from the walls of said casing and said receptacle so as to form a tortuous air passage between them, an air pipe extending into said casing and terminating within said receptacle below said hood, a second air pipe connected to said casing, means for causing a current of air to flow through said passage from one to the other of said pipes, said receptacle being adapted to hold liquid in such position that it will serve for deflecting the air current upwardly, and a heater arranged in said hood adjacent to the end of said first air pipe.

10. In an air conditioning apparatus, the combination of an outer casing, a receptacle supported therein, a hood covering said receptacle and having the walls thereof spaced away from the walls of said casing and said receptacle so as form a tortuous air passage between them, an air pipe extending into said casing and terminating within said receptacle below said hood, a second air pipe connected to said casing, means for causing a current of air to flow through said passage from one to the other of said pipes, said receptacle being adapted to hold liquid in such position that it will serve for deflecting the air current upwardly, and heating means arranged within said casing adjacent to said second pipe.

11. In an air conditioning apparatus, the combination of an outer casing, a receptacle supported therein, a hood covering said receptacle and having the walls thereof spaced away from the walls of said casing and said receptacle so as to form a tortuous air passage between them, an air pipe extending into said casing and terminating within said receptacle below said hood, a second air pipe connected to said casing, means for causing a current of air to flow through said passage from one to the other of said pipes, said receptacle being adapted to hold liquid in such position that it will serve for deflecting the air current upwardly, and heating means supported within said casing and said hood adjacent to the ends of said pipes.

12. In an air conditioning apparatus, the combination of an outer casing, a receptacle supported therein, a hood covering said receptacle and having the walls thereof spaced away from the walls of said casing and said receptacle so as to form a tortuous air passage between them, an air pipe extending into said casing and terminating within said receptacle below said hood, a second air pipe connected to said casing, means for causing a current of air to flow through said passage from one to the other of said pipes, said receptacle being adapted to hold liquid in such position that it will serve for deflecting the air current upwardly, and electrical heating coils arranged within said casing and hood adjacent to the ends of said pipes.

13. In an air conditioning apparatus, the combination of liquid receptacles mounted one within the other in spaced relation, a baffle wall interposed between the adjacent walls of said receptacles and adapted to form a tortuous air passage between them, air deflecting means above the open part of one of said receptacles and with said baffle wall forming a closure for the space above said receptacle, each of said receptacles being adapted to hold liquid at such level that the surface thereof will deflect the air current, an air pipe terminating above and adjacent to the surface of the liquid in the inner said receptacle, a second air pipe communicating with the other said receptacle above the surface of the liquid therein, means for causing the current of air to flow through said passage from one to the other of said pipes, and heating means arranged adjacent to said inlet and outlet openings.

14. In an air conditioning apparatus, the combination of a casing having air inlet and outlet openings, spaced baffle walls mounted within said casing and adapted to form a tortuous air passage between said openings, an air inlet pipe connected to said inlet opening, an open liquid receptacle mounted in said pipe, means for continuously supplying liquid to said receptacle to cause it to overflow into said pipe, and means for causing a current of air to flow through said passage from one to the other of said openings.

15. In an air conditioning apparatus, the combination of a casing having air inlet and outlet openings, spaced baffle walls mounted within said casing and adapted to form a tortuous air passage between said openings, an air inlet pipe connected to said inlet opening, an annular trough mounted in said pipe, means for continuously supplying liquid to said trough to cause it to overflow into said pipe and means for causing a current of air to flow through said passage from one to the other of said openings.

16. In an air conditioning apparatus, the combination of a closed tank adapted to contain a quantity of liquid, an air outlet pipe connected to said tank, an air inlet pipe extending upwardly into said tank and terminating above the surface of said liquid, baffle walls supported in said tank and adapted to form a tortuous air passage between said pipes, spraying means in said air inlet pipe below said tank and connected to said tank and adapted to spray liquid therefrom, and means connected to said inlet pipe and adapted to cause a current of air to flow through said passage from said inlet pipe to said outlet pipe.

17. In an air conditioning apparatus, the combination of an outer casing, a liquid receptacle supported therein, a hood covering said receptacle and having the side walls thereof interposed between and spaced away from the walls of said casing and receptacle so as to form a tortuous air passage between them, an air inlet pipe extending from below said casing and communicating with the space between said receptacle and hood, a spraying device communicating with said casing and adapted by gravity to receive liquid from said casing and discharge the same into said inlet pipe, means for causing a current of air to flow through said inlet pipe toward said tortuous air passage, said inner receptacle being located and arranged to collect the surplus moisture carried by the inflowing air current and to overflow into said casing and all being arranged to cause a circulation of water and maintain a substantially uniform water level in said receptacle.

18. In an air conditioning apparatus, the combination of an outer casing, a liquid receptacle supported therein, a hood covering said receptacle and having the side walls thereof interposed between and spaced away from the walls of said casing and receptacle so as to form a tortuous air passage between them, an air inlet pipe communicating with the space between said receptacle and hood, a spraying device communicating with said casing and adapted to receive liquid from said casing and discharge the same into said inlet pipe, means for causing a current of air to flow through said inlet pipe toward said tortuous air passage, said inner receptacle being located and arranged to collect the surplus moisture carried by the inflowing air current and to overflow into said casing and all being arranged to cause a circulation of water and maintain a substantially uniform water level in said receptacle.

Signed at Chicago, this 3rd day of March, 1901.

ALLEN A. BLOMFELDT.

Witnesses:
EUGENE A. RUMMLER,
MARY M. DILLMAN.